United States Patent Office 3,456,939
Patented July 22, 1969

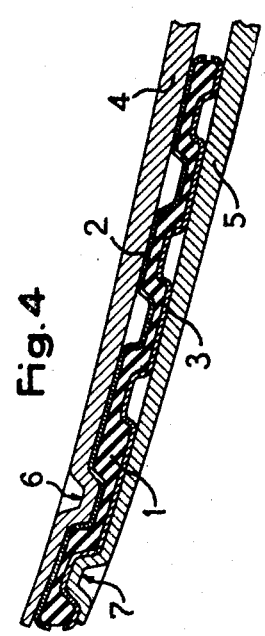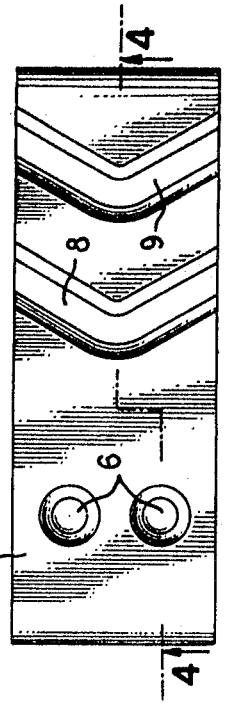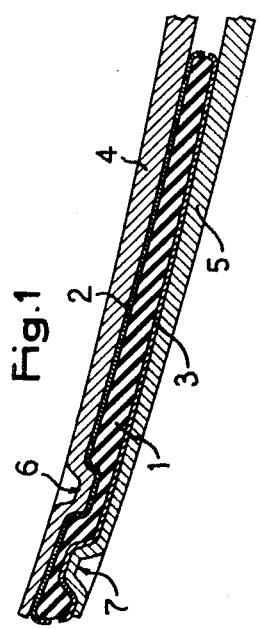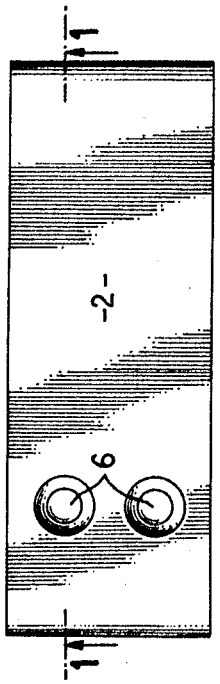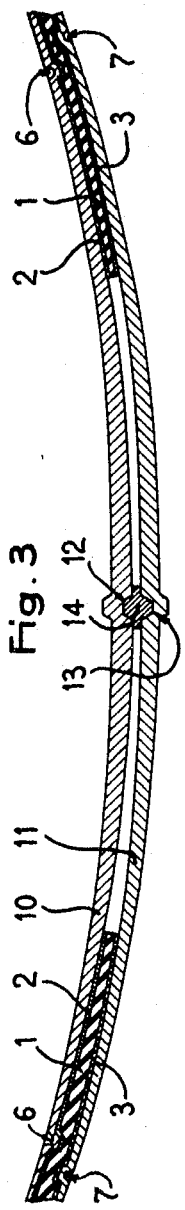

3,456,939
DAMPER AND ITS APPLICATIONS IN PARTICULAR IN VEHICLE SUSPENSION SPRINGS
Michael Duchemin, Lambres-les-Douai, France, assignor to Ressorts du Nord S.A., Levallois-Perret, France, a French body corporate
Filed June 28, 1966, Ser. No. 561,256
Claims priority, application France, July 1, 1965, 23,051
Int. Cl. B60g *11/02;* F16f *1/18*
U.S. Cl. 267—47                                     4 Claims

ABSTRACT OF THE DISCLOSURE

A damper for damping a relative movement between two elements such as spring leaves, comprising two elongated metal plates adapted to be fixed respectively at or adjacent one of the longitudinal ends thereof to said elements, and a layer of elastomer located between and vulcanized to said plates, whereby relative movements between said elements are transmitted to the plates and are damped by the elastomer which is subjected to a constant and maximum shear stress over the whole length of the damper.

---

The present invention relates to apparatus for damping oscillations in particular in the suspension of vehicles.

Multi-leaf springs are known which are employed in the suspension of vehicles and have the advantage of damping their own oscillations by the rubbing produced between the various leaves. In this case, the damping is the better as the number of leaves is greater; however, the weight of the spring is considerably increased.

On the other hand, if, in order to obtain a light spring, the number of leaves is reduced as far as possible in so designing them that each has the profile of a solid of uniform strength, the damping drops to a value which is so low that it is necessary to add an independent damper which is heavy and costly.

The object of the invention is to provide springs which have a very small number of leaves but possess nonetheless very good damping properties.

The damper according to the invention, damps a relative movement between two elements and in particular between two leaves of a suspension spring and comprises a material, such as an elastomer, fixed between two generally elongated metal plates which are adapted to be respectively connected to said elements whose relative movement must be damped.

According to another feature of the invention, the elastomer is secured to the metal plates by a hot vulcanization process.

Another object of the invention is to provide a leaf spring or other device comprising at least one damper of the above-defined type.

Further features and advantages of the invention will be apparent from the ensuing description with reference to the accompanying drawing.

In the drawing:
FIG. 1 is a sectional view taken along line 2—2 of FIG. 2 of one embodiment according to the invention in position between two leaves of a suspension spring, a part of which is shown;
FIG. 2 is a corresponding plan view of the damper on its own;
FIG. 3 is a longitudinal sectional view of a double-leaf spring provided with dampers according to the invention;
FIG. 4 is a sectional view, taken along line 4—4 of FIG. 5, of another embodiment of the damper in position between two leaves of a spring, and FIG. 5 is a corresponding plan view of the damper on its own.

In the embodiment shown in FIGS. 1 and 2, the damper according to the invention comprises a layer 1 of elastomer which can be an isobutylene or isoprene copolymer, or any other elastomer having a high damping power. This elastomer is placed between two elongated metal plates 2 and 3 to which it is fixed, for example by the hot vulcanization thereof to the metal surface.

The plates 2 and 3 are connected to two elements 4 and 5 whose relative movement is to be damped, these elements could be the leaves of a suspension spring.

Studs 6 and 7, which are formed in the leaves and in the plates by a press operation and which protrude in the layer of elastomer, are adapted to transmit to the damper, the relative movement produced between the leaves 4 and 5 in the course of the flexing or bending of the spring.

The spring shown in FIG. 3 comprises two leaves 10 and 11 in the shape of a solid of uniform strength which are interconnected at their mid-point by pressed-out portions 12 and 13 which are adapted to one or several intermediate elements 14 so as to avoid relative movement between the mid-points of the leaves. This connection could achieve moreover by means of a bolt which extends through an aperture formed at the mid-point of each of the leaves or by clamping the leaves together to a sufficient extent or by any other means. A damper according to the invention is fixed between the two leaves at each end of the spring.

Such a spring operates in the following manner:

As the spring flexes or bends, the ends of the leaves undergo a relative movement which is transmitted to the plates 2 and 3 by the studs 6 and 7. This movement subjects the elastomer to high shear stresses, thus producing the damping. The prior compression of the elastomer between the plates aids its resistance to the deformations it has to undergo.

In the embodiment shown in FIGS. 4 and 5, the plates 2 and 3 are corrugated in such manner that the elastomer that they compress in the course of clamping is subjected to high shear stresses which increases its damping effect. These corrugated plates are obtained in the described embodiments by a press operation which produces herring-bone shaped recesses 8 and 9. They also ensure the rigidity of the plates.

Although specific embodiments of the invention have been described, many modifications and changes may be made therein without departing from the scope of the invention as defined in the appended claims.

Having now described my invention what I claim as new and desire to secure by Letters Patent is:

1. A suspension leaf-spring comprising two leaves and two dampers, one of said dampers being located at each end of and between said leaves, each of said dampers comprising two elongated metal plates, a layer of elastomer located between and vulcanized to said plates, and means provided respectively at the ends of the leaves and at the corresponding ends of the plates for preventing relative longitudinal movement between the plates of each damper and the leaves adjacent said plates and for subjecting said elastomer to a generally constant and maximum shear stress when relative longitudinal movement occurs between said leaves.

2. A damper as claimed in claim 1, wherein said plates comprise corrugated portions protruding in said layer of elastomer and extending generally transversely with respect to the length of said plates, thereby increasing the shear stress in said layer.

3. A suspension leaf-spring comprising two leaves and two dampers, one of said dampers being located at each end of and between said leaves, each of said dampers comprising two elongated metal plates, the longer dimension of which is substantially parallel to the longitudinal direction of the leaves, a layer of elastomer located between said plates and vulcanized thereto, and interengaged studs and recesses, protruding in the layer of elastomer, integral with and interconnecting the ends of said leaves and adjacent zones of the adjacent plates of each damper so as to prevent relative longitudinal movement between the ends of each of said leaves and the adjacent plate and transmit the relative movement between the ends of said leaves to said plates of each damper, thereby subjecting the elastomer of said layer to the same shear stress over the whole length of each damper.

4. A suspension leaf-spring comprising two leaves and two dampers, one of said dampers being located at each end of and between said leaves, each of said dampers comprising two elongated metal plates, the longer dimension of which is substantially parallel to the longitudinal direction of the leaves, a layer of elastomer located between said plates and vulcanized thereto, said plates comprising corrugated portions protruding in said layer of elastomer and extending generally transversely with respect to the longer dimension of the plates, and interengaged studs and recesses, protruding in the layer of elastomer, integral with and interconnecting the ends of said leaves and adjacent zones of the adjacent plates of each damper so as to prevent relative longitudinal movement between the ends of each of said leaves and the adjacent plate and transmit the relative movement between the ends of said leaves to said plates of each damper, thereby subjecting the elastomer of said layer to the same shear stress over the whole length of each damper.

References Cited
UNITED STATES PATENTS

| | | | |
|---|---|---|---|
| 1,759,722 | 5/1930 | Watson | 267—47 |
| 2,049,555 | 8/1936 | Zaparka | 267—47 XR |
| 2,161,838 | 6/1939 | Thompson | 267—47 |
| 2,270,516 | 1/1942 | Dow | 267—49 |
| 2,476,367 | 7/1949 | Guernsey | 267—49 |
| 2,559,105 | 7/1951 | Banning | 267—47 |
| 3,079,277 | 2/1963 | Painter. | |
| 3,231,256 | 1/1966 | Olson. | |

ARTHUR L. LA POINT, Primary Examiner